Jan. 16, 1968     D. IORDANIDIS     3,364,363

PHASE SEQUENCE SENSING CIRCUIT

Filed Feb. 15, 1965

INVENTOR.
DEMETRE IORDANIDIS
BY~ Maybee & Legris

ATTORNEYS

United States Patent Office 3,364,363
Patented Jan. 16, 1968

3,364,363
PHASE SEQUENCE SENSING CIRCUIT
Demetre Iordanidis, Toronto, Ontario, Canada, assignor, by mesne assignments, to Dover Corporation, New York, N.Y.
Filed Feb. 15, 1965, Ser. No. 432,501
5 Claims. (Cl. 307—127)

ABSTRACT OF THE DISCLOSURE

A phase sequence sensing circuit for sensing a predetermined sequence of phases of an alternating current source having three supply terminals, comprises a controlled rectifier connected across one pair of terminals, means responsive to the voltage across another pair of terminals for producing a timed recurring control signal, and a control device connected to the controlled rectifier and responsive to the control signal for producing pulses which are applied to a controlled electrode of the rectifier for rendering the rectifier conductive.

---

This invention relates to a phase sensitive device and in particular to a phase sequence sensing circuit for use with three phase alternating current circuits.

Three phase alternating current electrical equipment such as electric motors and transformers can be damaged by incorrect phase rotation and by open circuit conditions, and in order to protect such equipment it is therefore necessary to ensure that the sequence of the phases is correct and that no phase is missing. Typical known protection devices are electromechanical in nature and in general they are rather complicated and have a relatively long time delay because of the inertia of their moving parts.

An object of this invention is to provide a phase sequence sensing circuit that can use semiconductor components, can have no moving parts (except for a relay if one can be used as a load), and is simple and relatively inexpensive.

An embodiment of the invention is illustrated by way of example in the accompanying drawing, in which.

Figure 1:
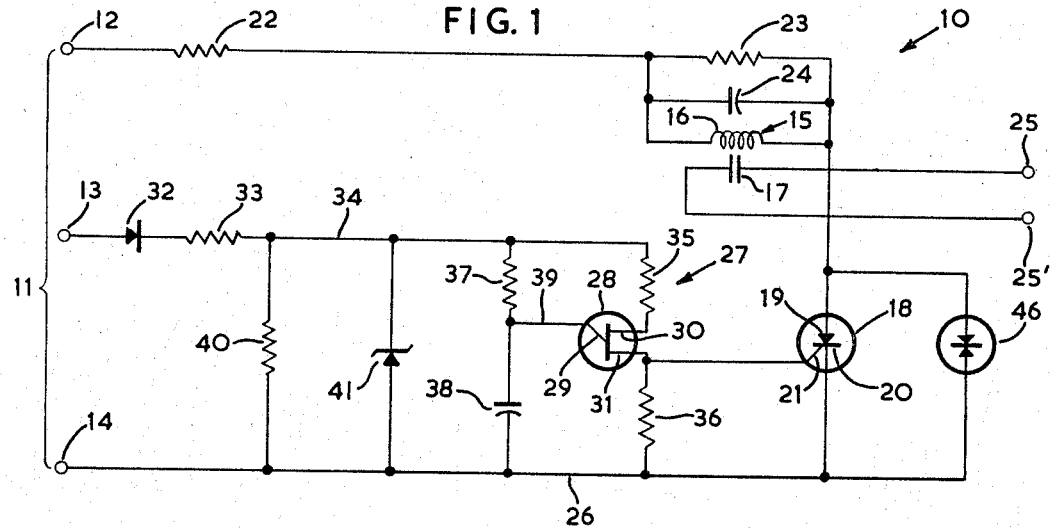
FIG. 1 is a schematic circuit drawing of a phase sequence sensing circuit embodying the invention.

Referring now to FIG. 1, a phase sequence sensing circuit 10 is used for sensing a predetermined sequence of a three phase alternating current source 11 having voltage terminals 12, 13 and 14.

A relay 15 having a coil 16 and a pair of normally open switch contact 17 constitutes a load for the circuit and it is connected in series with a controlled rectifier, for example a semiconductor controlled rectifier 18 having an anode 19, a cathode 20 and a gate electrode 21, the anode 19 of the rectifier being connected to one lead of the coil 16. The other lead of the coil 16 is connected to the terminal 12 through a resistor 22. A resistor 23 and a smoothing capacitor 24 are connected across the coil 16, the resistors 22 and 23 constituting a voltage dividing network for the coil 16. The two switch contacts 17 are respectively connected to output terminals 25 and 25'. The cathode 20 of the rectifier 18 is connected to a common lead 26 which is connected to the terminal 14, and a transient voltage suppressor diode 46 is connected across the rectifier 18 to protect it against line transient voltages.

The rectifier 18 may be rendered conductive by applying a positive pulse to the gate electrode 21 when the anode 19 is positive. This is accomplished by a control means generally indicated by the reference numeral 27 which preferably comprises a unijunction transistor 28 in a conventional relaxation oscillator circuit. The transistor 28 has an emitter electrode 29, a base-two electrode 30 and a base-one electrode 31 which is connected to the gate electrode 21 of the rectifier 18. A diode 32 and a voltage dropping resistor 33 are connected in series, with the anode of the diode 32 being connected to the terminal 13. The end of the resistor 33 opposite to the diode 32 is connected to a common lead 34 and it will be noted that positive half cycles only will appear between leads 34 and 26. The base-two electrode 30 is connected to lead 34 through a temperature compensating resistor 35 and the base-one electrode 31 is connected to the lead 26 through an output resistor 36.

A timed recurring control signal for controlling the transistor 28 is provided by a time delay circuit comprising a resistor 37 and a capacitor 38 connected in series across the leads 34 and 26. A lead 39 connects the junction of the resistor 37 and the capacitor 38 with the emitter electrode 29 of the transistor 28. A resistor 40 and a Zener diode 41 are each connected across the leads 34 and 26 and they provide clipping and stabilization.

Figure 2:
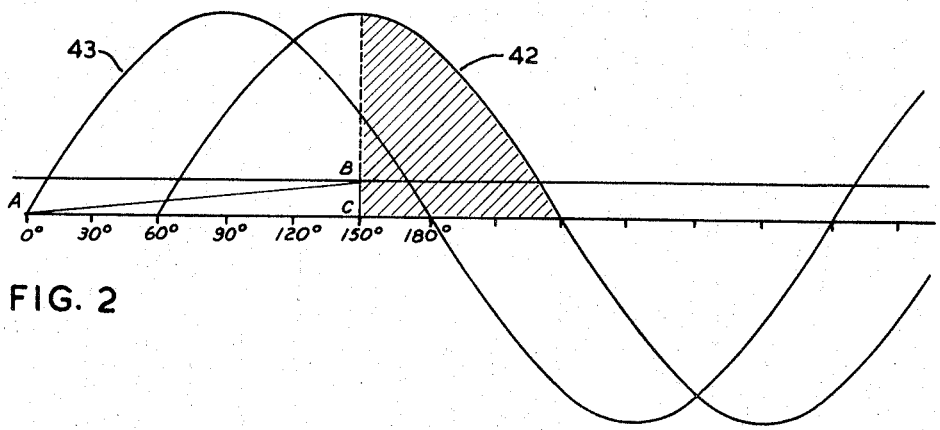
FIG. 2 is a graph showing the relationship between two alternating current source voltages, with the phases of the source connected in a sequence that is assumed to be correct.

In FIG. 2 reference numeral 42 indicates a sine wave voltage which appears across terminals 12 and 14 and reference numeral 43 indicates a sine wave voltage which appears across terminals 13 and 14. The so called correct sequence of phases is as follows. If the three phases of the alternating current source 11 are called phase 1, phase 2 and phase 3, and these phases respectively appear at the terminals 12, 13 and 14, the voltage 42 is the voltage waveform of phase 1 with respect to phase 3 and the voltage 43 is the voltage waveform of phase 2 with respect to phase 3.

The operation of the circuit 10 will now be described in greater detail, with the assumption that the above described sequence of phases is the correct or predetermined sequence.

The positive half cycle of the voltage 43 is applied to the base-two electrode 30 of the transistor 28 and to the time delay circuit comprising the resistor 37 and the capacitor 38, and the capacitor 38 begins to charge through the resistor 37 following in rough approximation the path AB in FIG. 2. The RC constant of the resistor 37 and the capacitor 38 is such that the capacitor 38 charges up to the peak point emitter voltage of the transistor 28 (firing voltage) at a time which preferably corresponds to an electrical angle of 150° (indicated as point C). It will be noted that point C coincides with the voltage peak of the voltage 42, and at point C the voltage across the capacitor 38 reaches the peak point emitter voltage of the transistor 28 which consequently fires, producing a positive pulse that is applied to the gate electrode 21 of the rectifier 18.

Simultaneously, the voltage 42 is applied through the coil 16 to the anode 19 of the rectifier 18, and as mentioned above when the transistor 28 fires and a positive pulse is applied to the gate electrode 21 the voltage 42 applied to the anode 18 is at its positive peak value. Consequently the rectifier 18 is rendered conductive, current flows through the coil 16 and the contacts 17 close. In each cycle the above operation is repeated and the relay 15 remains energized by a pulsating direct current voltage which flows through the coil 16.

It is preferred that the transistor 28 fire at about point C since this point coincides with the voltage peak of the voltage 42, but the circuit will operate satisfactorily under a reasonably wide range of conditions if the firing point is within the rough limits of 120° to 180°. Theoretically the limits are broader than this, being governed only by the firing voltage of the transistor 28 and the sensitivity of the relay 15, but in practice the source voltages may be complex and unknown, hence the 150° point is the optimum. The shaded area of the voltage 42 in FIG. 2 represents the portion of the voltage wave 42 which constitutes the pulsating direct current voltage for energizing the relay 15.

Figure 3:
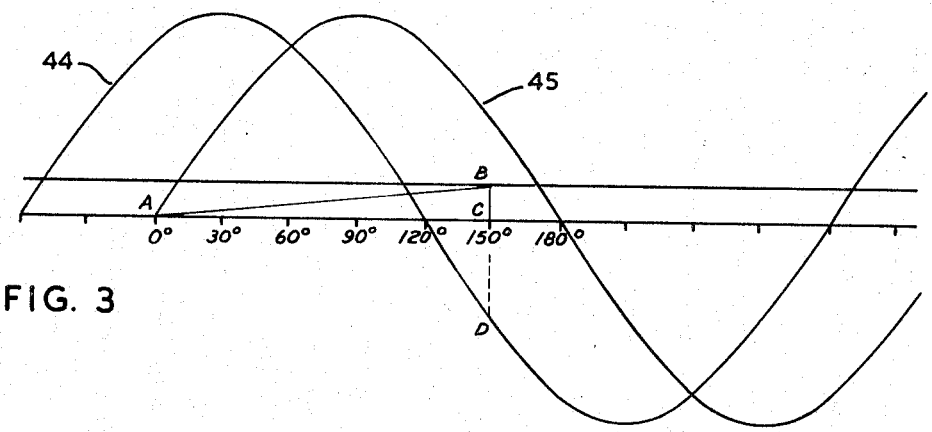
FIG. 3 is a graph showing the relationship between two alternating current source voltages, with the phases connected in an incorrect sequence.

The operation of the circuit 10 when fed by an incorrect sequence of phases will now be described with reference to FIG. 3. In the description above it was assumed that the correct sequence of phases is phase 1, phase 2 and phase 3 respectively connected to terminals 12, 13 and 14. It is now assumed that phase 1 appears at terminal 13, phase 2 appears at terminal 12 and phase 3 appears at terminal 14. A sine wave 44 represents the voltage between terminals 12 and 14 and a sine wave 45 represents the voltage between terminals 13 and 14. The positive half cycle of the voltage 45 is applied to the transistor 28 and to the time delay circuit comprising the resistor 37 and the capacitor 38, and as described above the transistor 28 fires at a time which corresponds to an electrical angle of 150° (point C). Point C in this case, however, coincides with a point D on the negative half cycle of the voltage 44 and not with a positive peak as before. Consequently, the rectifier 18, although triggered at its gate electrode 21 by a positive pulse from the transistor 28 at point C, will not conduct or switch on because at that instant the negative half cycle of the voltage 44 is applied to its anode. In each cycle the same operation is repeated, the rectifier 18 remains in its non-conductive condition and the relay 15 remains not energized.

Other incorrect phase sequences, i.e. phase sequences other than the assumed correct phase sequence defined above, will likewise fail to cause the relay 15 to be energized. Similarly, it is evident that if one or more phases are missing (i.e. there is an open circuit condition in the source) the relay 15 will not be energized.

Although a relay has been described as a load, it is of course contemplated that in some applications it may be advantageous to substitute other kinds of resistive or inductive loads.

Preferred values of the components used in the circuit described above are as follows, for a three phase, 115 volts, 60 cycles per second alternating current source:

Resistor 22—250 ohms, 20 watts
Resistor 23—200 ohms, 10 watts
Resistor 33—6800 ohms, 3 watts
Resistor 35—390 ohms, ½ watt
Resistor 36—47 ohms, ½ watt
Resistor 37—39,000 ohms, ½ watt
Resistor 40—680 ohms, 1 watt
Capacitor 24—100 mfd., 50 volts
Capacitor 38—0.22 mfd., 50 volts
Diode 46—transient voltage suppressor for 120 volts
Diode 32—400 volt p.i.v., 100 ma.
Zener Diode 41—12 volts, ½ watt Transistor 28—unijunction transistor 2N2646 or equivalent
Rectifier 18—silicon controlled rectifier, p.i.v. 300 v., 1 amp.
Relay 15—coil resistance 2000Ω.

What I claim is:

1. A phase sequence sensing circuit for sensing a predetermined sequence of phases of an alternating current source having first, second and third voltage terminals, said circuit comprising a load that is connected in series with a controlled rectifier having a gate electrode, the load and the rectifier being connected across the first and third terminals, means responsive to the phase of the voltage across the second and third terminals during positive half cycles of said voltage for producing a recurring control signal which exceeds a predetermined level at a predetermined time when the voltage across the first and third terminals is positive, and control means connected to the gate electrode of the controlled rectifier and responsive to the control signal for producing recurring positive pulses in response to and at a predetermined time when said control signal exceeds said predetermined level, the rectifier being rendered conductive when a positive pulse is applied to the gate electrode and concurrently the anode of the controlled rectifier is positive, whereby current flows through the load when the phases are in the predetermined sequence.

2. A phase sequence sensing circuit as claimed in claim 1 wherein the control means is a unijunction transistor connected as a relaxation oscillator, said transistor having an emitter and two base electrodes, the emitter being connected to the control signal producing means, one base electrode being connected to the second voltage terminal, and the other base electrode being connected to the gate electrode of the rectifier.

3. A phase sequence circuit as claimed in claim 1 wherein the control signal producing means is a resistor and a capacitor connected in series across the second and third terminals and the control signal is positive.

4. A phase sequence sensing circuit as claimed in claim 1 wherein the positive pulses produced by the control means occur at times corresponding to a phase angle between about 120° to 180° after a voltage zero across the second and third terminals, during a positive half cycle of said voltage.

5. A phase sequence sensing circiut as claimed in claim 4 wherein the phase angle is 150°.

References Cited
UNITED STATES PATENTS

| | | | |
|---|---|---|---|
| 2,900,528 | 8/1959 | Baude | 307—127 X |
| 3,039,023 | 6/1962 | Thompson | 317—48 |
| 3,123,813 | 3/1964 | Baude | 307—127 X |

ORIS L. RADER, *Primary Examiner.*

T. B. JOIKE, *Assistant Examiner.*